United States Patent [19]

Edson

[11] 4,409,642
[45] Oct. 11, 1983

[54] OFFSET LEAD CONFIGURATION FOR SOLID ELECTROLYTE CAPACITOR

[75] Inventor: Douglas M. Edson, Alfred, Me.

[73] Assignee: Sprague Electric Company, North Adams, Mass.

[21] Appl. No.: 209,818

[22] Filed: Nov. 24, 1980

[51] Int. Cl.³ .......................... H01G 9/00; B01J 17/00
[52] U.S. Cl. ........................................ 361/433; 29/570
[58] Field of Search ........................... 361/433; 29/570

[56] References Cited

U.S. PATENT DOCUMENTS

| | | | |
|---|---|---|---|
| 3,349,294 | 10/1967 | Heinimann | 361/433 |
| 3,374,536 | 3/1968 | Schroeder et al. | 361/433 |
| 3,588,628 | 6/1971 | Peck | 361/433 |
| 3,667,002 | 5/1972 | Klein | 317/230 |
| 4,097,916 | 6/1978 | Piper | 361/433 |
| 4,162,518 | 7/1979 | Curlis | 361/433 |
| 4,185,317 | 1/1980 | Lambrecht | 361/433 |

*Primary Examiner*—Andrew J. James
*Assistant Examiner*—Seth Nehrbass

[57] ABSTRACT

A portion of the anode lead of a solid electrolyte capacitor is offset so that the remaining portion of the anode lead is coaxial with the anode riser, and these and the cathode lead are coplanar. The offset portion of the anode lead is bent transversely, and the riser is connected to this transverse. Preferably, the anode lead and the cathode lead are of different diameters.

6 Claims, 5 Drawing Figures

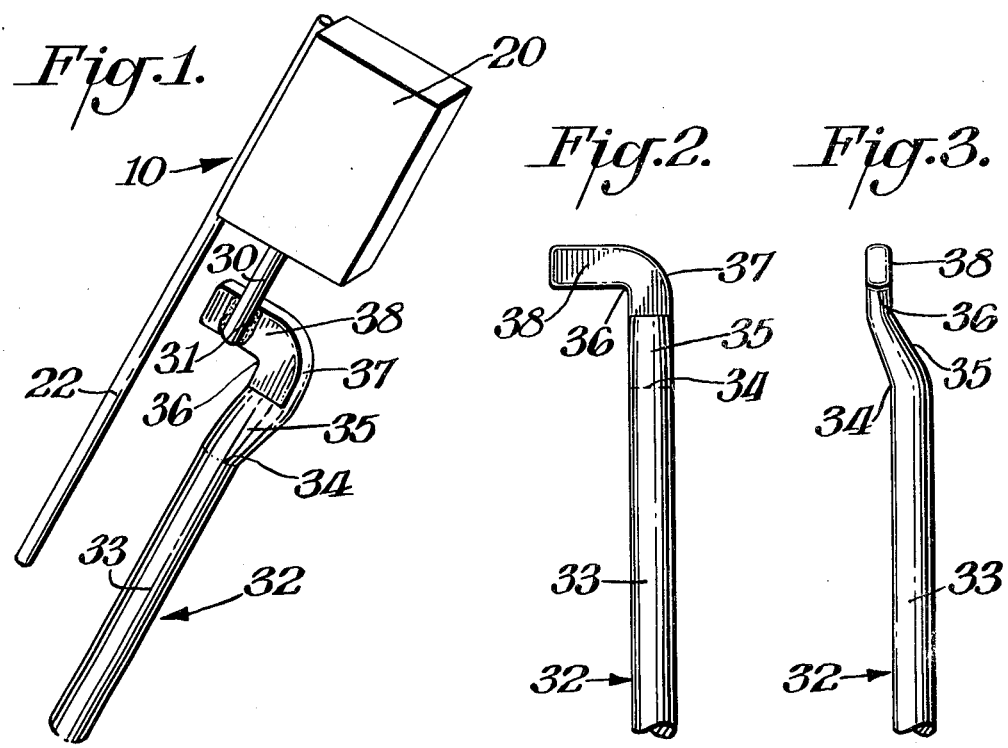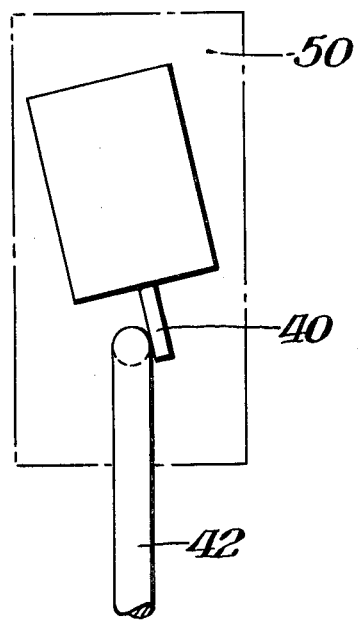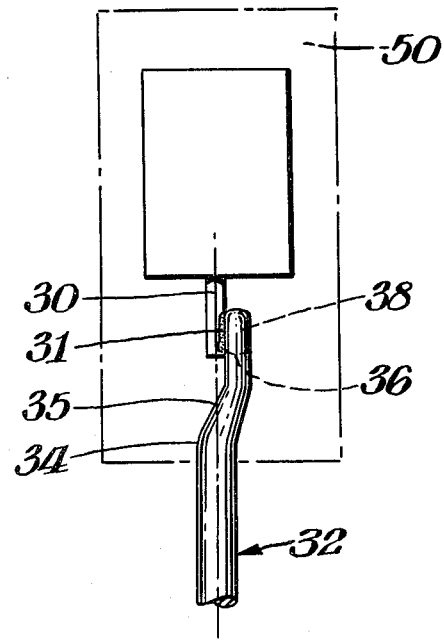

OFFSET LEAD CONFIGURATION FOR SOLID ELECTROLYTE CAPACITOR

BACKGROUND OF THE INVENTION

This invention relates to an offset lead configuration for a solid electrolyte capacitor. More particularly this invention relates to an offset lead configuration whereby the non-offset portion of the anode lead is coaxial with the riser, and it, the cathode lead, and the riser are all coplanar.

In the manufacture of solid electrolyte capacitors that are encased in molded cases or encapsulants, it has long been known in the prior art to use the lead wires to position the units in the molds. However, if the wires are misaligned it is likely that the face of the capacitor will be too close to, or "show-through", the subsequently molded encapsulant. It is common practice to tilt the units prior to molding, but it is still possible for edges of the capacitor to "show-through".

It is also common practice to ensure in a variety of ways, including markings, that a polar capacitor can be connected electrically into a circuit only in the proper polarity. One such prior art method involves the use of different size anode and cathode lead wires. However, such use has led to greater misalignment during molding, and more "show-throughs" and electrical losses.

SUMMARY OF THE INVENTION

A feature of this invention is the provision of an offset lead configuration for the anode of a solid electrolyte capacitor whereby the riser is coaxial with a non-offset portion of the anode lead, and these and the cathode lead are coplanar, thus permitting proper alignment of the units in molds and thereby reducing "show-throughs". It is another feature of this invention that the foregoing alignment is accomplished even when one lead is of different diameter than the other.

According to the present invention, the anode lead for a solid electrolyte capacitor is provided with three spaced elbows or bends. Two such elbows divide the anode lead into a long extending portion and a shorter portion that is offset via the elbows into a plane spaced from and parallel to the plane in which the long extending portion is located. The third elbow bends the outer end of the offset portion about 90° to form a transverse piece to which the anode riser is attached. The transverse piece is preferably flattened along its length, and the riser attachment is made to the flattened side.

The cathode lead is attached in a conventional manner to the conductive outer layer of the solid electrolyte capacitor. This cathode lead is coplanar with the anode riser and the extending long portion of the anode lead.

This invention permits the use in molded polar capacitors of one lead wire having a different diameter than the other so as to prevent reverse connection of the capacitor, particularly plug-in units. Preferably, the anode lead is of larger diameter than the cathode lead wire.

BRIEF DESCRIPTION OF THE DRAWING

FIG. 1 is a perspective of a solid electrolyte capacitor of this invention.

FIG. 2 is a side elevational view of the anode lead wire of FIG. 1.

FIG. 3 is another side elevational view of the anode lead wire taken at 90° from FIG. 2.

FIG. 4 is a cross-section of a molded solid electrolyte capacitor of the prior art.

FIG. 5 is a cross-section of a molded capacitor utilizing the FIG. 1 construction of this invention.

DESCRIPTION OF THE PREFERRED EMBODIMENTS

FIG. 1 shows a perspective view of a solid electrolyte capacitor 10 of this invention. Capacitor 10 includes a conductive cathode coating 20 to which is attached cathode lead wire 22. Riser 30 extends from the anode pellet of capacitor 10 and is terminated by anode lead wire 32, as by means of weld 31.

In order to center capacitor 10 in its molded case and thereby reduce or prevent shorts, show-through, blow, and DCL losses, anode lead 32 is provided with two offset bends 34 and 36 as well as a transverse bend 37. FIGS. 2 and 3 show the wireform that is employed as the anode lead 32 in the capacitor 10 of this invention. The elbows 34 and 36 of the offset 35 and the elbow 37 for the transverse 38 are preferably made at separate operations during manufacture. However, it is within the scope of this invention to combine one or more of the operations for forming anode lead 32 into a single wireforming step.

The upper elbow 37 is shown forming portion 38 into a transverse. Anode lead 32 is provided with two elbows 34 and 36 forming an anode lead portion 36 offset from the rest of the anode lead 32 and in a plane spaced from the first plane in which the long portion 33 of anode lead 32 lies. In the same operation that the offset elbows 34 and 36 are formed, the transverse section 38 is flattened.

FIG. 3 portrays a different view of anode lead 32 with elbows 34 and 36 offsetting flattened transverse 38 into the different second plane than that in which the long portion 33 of anode lead 32 lies. The second plane is spaced from the first plane by the sum of the radii of the riser 30 and the transverse portion 38 of anode lead wire 32.

The attachment of the anode pellet of capacitor 10 to anode lead 32 via transverse 38 is shown in FIG. 1. Anode riser 30 extends from capacitor 10 and is attached, preferably by weld 31 to a flattened side of transverse 38. Riser 30 passes in front of transverse 38 so that riser 30 lies in the same first plane as long portion 33 anode lead 32.

Cathode lead 22 is attached to the cathode coating 20 along one side of capacitor 10 parallel to anode lead 32 and lies in the same first plane as anode lead 32 and riser 30. FIG. 4 depicts the prior art practice of molding without the offset anode construction of this invention.

If an offset is not provided, when a capacitor body is attached by a riser 40 to a transverse piece of a straight anode lead wire 42, the riser and the anode lead wire cannot lie in the same plane. Consequently, even if the unit is tilted prior to being molded in case 50, as shown in FIG. 4, some faulty units are the result.

The molded capacitor of this invention is shown in FIG. 5, where the anode lead 32 of this invention is provided with the offsetting elbows 34 and 36 and the riser 30 is attached to transverse 38 so that riser 30 and anode lead 32 are coaxial and coplanar, thus keeping capacitor 10 properly aligned in its molded encasement 50.

This invention is particularly advantageous when anode lead 32 is of different diameter, preferably larger than cathode lead 22. Without the offset of transverse 38, the larger diameter of anode lead 32 would require even more tilting of capacitor 10 when attachment via its riser is made. With small units, the ratio of the size of the wire compared to the rest of the unit would be greater than with larger units and of greater concern.

When 32 mils (0.81 mm) wire is used, two elbows 34 and 36 spaced 20 mils (0.51 mm) apart are formed, preferably simultaneously, to offset portion 38 by 20 mils (0.51 mm) from the rest of lead 32 and to flatten transverse 38 to 27 mils (0.68 mm) diameter. The spacing between the top of elbow 36 and the top of elbow 37 forming transverse 38 is preferably 50 mils (1.27 mm). When anode riser 30 is attached to flattened transverse 38, riser 30 will be coaxial and coplanar with long portion 33 of anode lead wire 30. Cathode lead 22 is attached to capacitor cathode coating 20 so that cathode lead 22, anode riser 30, and anode lead 32 are coplanar. All elbows at 34, 36 and 37 are about 90°, but are not sharp angles because of the flow of the wire during the formation of the elbows.

It is preferred that the elbows at 34 and 36 be spaced apart so that the offset is definite and so as not to overwork the wire at any one point. While either lead wire 22 or 32 may be the larger diameter one, it is preferable that the larger diameter wire be the one subjected to the cold working, and hence it is the anode wire that is preferably the larger.

What is claimed is:

1. A solid electrolyte capacitor comprising a capacitor body having a conductive cathode coating, a riser extending from said body and isolated from said coating, a cathode lead wire in contact with said coating, an anode lead wire in contact with said riser, and a molded encapsulating material surrounding and enclosing said body, said riser, and portions of said lead wires to form a case, said anode lead wire having three spaced apart elbows forming an offset bent transverse portion and a non-offset portion; said riser and said non-offset portion of said anode lead wire being coaxial with each other; two of said elbows offsetting said bent portion a spaced distance from said riser and said non-offset portion, the third of said elbows forming said bent transverse portion, said contact of riser to anode lead wire being at said bent transverse portion, and said transverse portion and said offset portion of said lead wire being enclosed in said case.

2. A capacitor according to claim 1 wherein said bent transverse portion of said anode lead wire is flattened.

3. A capacitor according to claim 1 wherein said spaced distance is the sum of the radii of said riser and of said bent and flattened transverse portion of said anode lead wire.

4. A capacitor according to claim 1 wherein said cathode lead wire is attached to one side of said pellet, and said non-offset portion of said anode lead wire is coplanar with said side of said pellet.

5. A capacitor according to claim 1 wherein said anode lead wire is of different diameter than said cathode lead wire.

6. A capacitor according to claim 5 wherein said anode lead wire is of larger diameter than said cathode lead wire.

* * * * *